United States Patent [19]

Imai

[11] 4,197,929
[45] Apr. 15, 1980

[54] DEVICE FOR PRODUCING DAMPING FORCE IN HYDRAULIC SHOCK ABSORBERS

[75] Inventor: Kiyonori Imai, Gifu, Japan
[73] Assignee: Kayaba Kogyo K.K., Tokyo, Japan
[21] Appl. No.: 3,008
[22] Filed: Jan. 12, 1979

[30] Foreign Application Priority Data

Jan. 13, 1978 [JP] Japan ..................................... 53-2413

[51] Int. Cl.$^2$ ............................................ F16F 9/348
[52] U.S. Cl. .................................................... 188/320
[58] Field of Search ................. 188/280, 282, 317, 320

[56] References Cited

U.S. PATENT DOCUMENTS 3,029,903  4/1962  Wasdell ................................ 188/320

FOREIGN PATENT DOCUMENTS 2424040  11/1975  Fed. Rep. of Germany ........... 188/317

*Primary Examiner*—Duane A. Reger
*Attorney, Agent, or Firm*—Saul Jecies

[57] ABSTRACT

A device for producing the damping force in a hydraulic shock absorber comprising a non-return valve element adapted to open in the compression stroke so as to permit the free flow of working oil, a leaf valve element adapted to deflect downwards under the pressure of the working oil flowing through the holes formed in the non-return valve element during the expansion stroke, thereby providing the damping force, and a support shim interposed between the non-return valve element and the leaf valve element. The leaf valve element and the support shim are interposed between a piston and a valve stop. The support shim has such an outer diameter that its outer periphery is in contact or in slightly radially inwardly spaced relationship with the inner circle of the annulus containing the holes of the non-return valve, whereby the variations in damping force produced by the deflections of the leaf valve element may be avoided, the service life or durability of the leaf valve element may be improved and the shock may be eliminated when the non-return valve element is closed.

4 Claims, 2 Drawing Figures

DEVICE FOR PRODUCING DAMPING FORCE IN HYDRAULIC SHOCK ABSORBERS

BACKGROUND OF THE INVENTION

The present invention relates to generally a piston valve device for producing the damping force in a hydraulic shock absorber and more particularly an improvement of a piston valve device for producing the damping force in a hydraulic shock absorber of type comprising a non-return valve element adapted to be opened during the compression stroke so as to permit the free flow of the working oil and a leaf valve element adapted to deflect downwards during the expansion stroke under the pressure of the working oil flowing through a plurality of holes formed through the non-return valve element, thereby producing the damping force, the improvement being capable of eliminating the variations in damping force, enhancing the durability of the leaf valve element and eliminating the shock produced when the non-return valve is closed, thereby offering a good riding quality when the hydraulic shock absorber is used on an automotive vehicle or a motorcycle.

The damping force producing piston valve device of the type described is disclosed in for instance U.S. Pat. No. 2,060,590, granted to J. E. Padgett, Nov. 10, 1936 and particularly in FIGS. 4 and 7 of the accompanying drawings thereof. However, the shock absorbing means disclosed therein has some defects to be described below.

During the compression stroke, the working fluid is forced upwardly through the passages 26 of the piston causing the flexible plate 29 (the leaf valve element) to be held in face to face contact with the rigid plate 28 (the non-return valve element) and causing both plates to move upwardly together away from the piston body. This lifting of the valve elements causes the rigid valve plate to separate from the annular seat, thereby allowing the working oil to flow upwardly around the outer edge of the rigid plate into the upper chamber 15 of the working cylinder. During the expansion stroke, the rigid valve plate 28 is seated against the piston body so that the working oil can be displaced downwardly through the piston only through the orifices of the rigid plate. The flexible plate 29 normally closes the orifices 32, but when the pressure acting on the flexible plate through the orifices increases sufficiently the flexible plate is sprung away from the rigid plate and a restricted displacement of fluid downwardly into the chamber 16 takes place. This restricted transfer of working oil produces a shock absorbing action. Since the leaf or flexible valve element is movable relative to the valve stop or guide 33, a clearance must be left between the valve stop or guide and the leaf or flexible valve element. As a result, in the case of the expansion stroke, the leaf or flexible valve element is forced to displace itself radially by a distance equal to the clearance. This means that during every expansion stroke, the portion of the leaf of flexible valve element in contact with the ridge 53 of the shoulder 52 of the piston is shifted so that the variations of the damping force result. The variations in the damping force are pronounced especially when the difference between the outer and inner diameters of the leaf or flexible valve element is small.

The damping force variation problem described above may be overcome by securely clamping the leaf or flexible valve element between the valve stop or guide and the piston. However, if the leaf or flexible valve element is clamped, it is forced to deflect upwards even during the compression stroke so that as the hydraulic shock absorber compresses and expands, the leaf or flexible valve element is forced to deflect it self upwards and downwards. As a result, the earlier breakdown of the leaf or flexible valve element due to fatique results.

Furthermore, there is another problem. That is, when the compression stroke changes to the expansion stroke so that the non-return or rigid valve element is closed, the flow of the working oil is cut off instantaneously even though for a very short time interval until the downward deflection of the leaf or flexible valve element starts, thus resulting in shock causing the degradation of the riding quality.

SUMMARY OF THE INVENTION

One of the objects of the present invention is therefore to provide a piston valve device for producing the damping force in a hydraulic shock absorber which is simple in construction yet capable of substantially overcoming the above and other problems encountered in the prior art devices.

According to the present invention, the above and other objects thereof may be accomplished by the provision of a support shim which is interposed between a non-return valve element and a leaf valve element, securely held in position between a valve stop and a piston together with the leaf valve element and has such an outer diameter that its outer periphery or edge is in contact with or in slightly radially inwardly spaced relationship with the inner circle of the annulus containing a plurality of equiangularly spaced holes formed through the non-return valve element.

Since the leaf valve element is securely clamped together with the support shim between the valve stop and the piston so that it may defects downwards always along a predetermined deflection line during the expansion stroke, whereby the damping force may be always well stabilized. Furthermore, the support shim serves to restrict the upward deflection of the leaf valve element during the compression stroke. Thus, the repetitive upward and downward deflections of the leaf valve element can be avoided, whereby the breakdown due to fatique may be prevented.

Furthermore, even when the non-return valve is closed, there may be left a passage for permitting the restricted flow of the working oil between the leaf valve element and the non-return valve element so that the shock which is accompanied by the closure of the non-return valve element when the compression stroke changes to the expansion stroke may be substantially eliminated or reduced to a minimum.

The above and other objects, features and advantages of the present invention will become more apparent from the following description of the preferred embodiments thereof taken in conjunction with the accompanying drawings.

DESCRIPTION OF THE PREFERRED EMBODIMENTS

Figure 1:
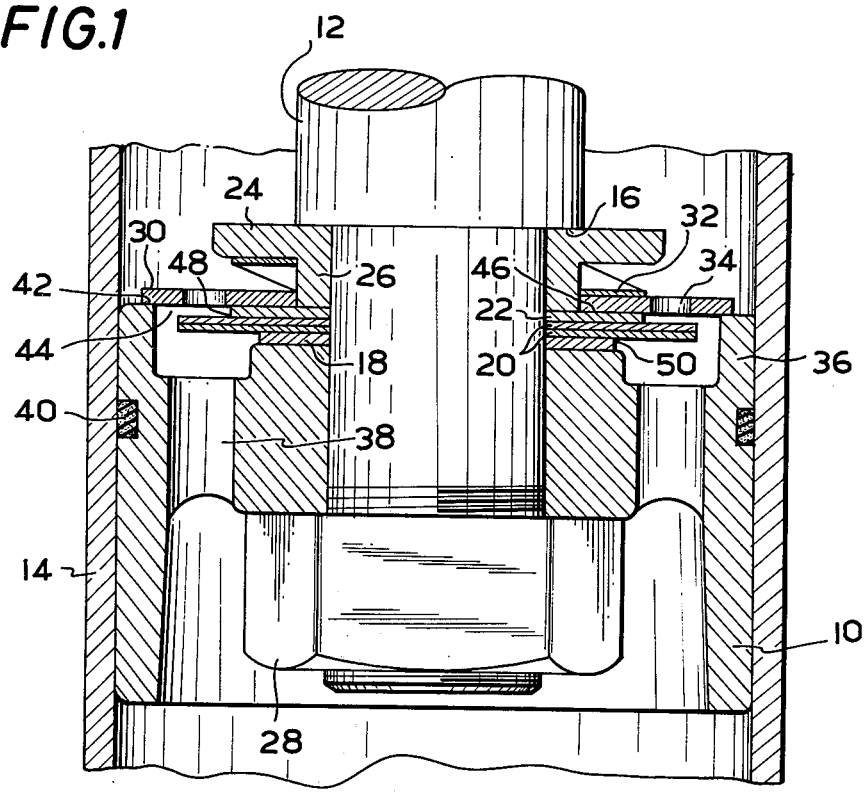
FIGS. 1 and 2 are schematic fragmentary views, respectively, of hydraulic shock absorbers incorporating piston valves for generating damping forces in accordance with the present invention.

First Embodiment, FIG. 1

Referring to FIG. 1, a hydraulic shock absorber has a piston rod 12 operatively connected to a piston 10 which is slidably fitted into a cylinder 14 and divides the latter into an upper working chamber and a lower working chamber both of which are filled with the working oil.

The piston rod 12 has a reduced-diameter lower end portion, and four major parts; that is, an annular shim 18, leaf valve elements 20, a support shim 22 and a valve stop 26 with an upper flange 24 being interposed between the shoulder 16 between the large-diameter and small-diameter portions of the piston rod 12 and the piston 10. These four major parts 18, 20, 22, 26 may be supplied in the form of a sub-assembly so as to facilitate the assembly with the piston rod 12 and piston 10. The lower end of the reduced-diameter lower portion of the piston rod 12 is securely fastened to the piston 10 with a nut 28.

A non-return valve element 30 is slidably fitted over the valve stop 26 and is in the form of an annular rigid plate or disk. A spring member 32, which has a relatively small force, is fitted over the valve stop 26 above the non-return valve element 30 normally biases the latter towards the piston 10. The non-return valve element 30 is formed with a plurality (two in FIG. 1) of holes 34 in such a manner that they will not offer any substantial resistances to the working oil flowing through them.

The piston 10 has an annular ridge 36 extended upright from the crown portion, a plurality of relatively large-diameter through holes 38 (only two being shown in FIG. 1) and a sealing member on ring 40 fitted into an annular groove formed in the outer peripheral wall of the piston 10. The annular ridge or wall 36 of the piston 10 supports the non-return valve element 30 adjacent at its outer periphery. That is, the top annular surface of the annular ridge or wall 36 of the piston 10 serves as an outer valve seat 42 for the non-return valve element 30.

The support shim 22 is in the form of an annular rigid plate or disk with an outer diameter equal to or less than the diameter of a circle along which are located the centers of the equiangularly spaced holes 34 of the non-return valve element 30 minus the diameter of these holes 34. Therefore the outer periphery of the support shim 22 is located adjacent to the inner circle of the annulus containing a plurality of equally spaced holes 34 of the non-return valve element 30. The thickness of the support shim 22 is so selected that an orifice passage 44 defined between the undersurface of the non-return valve element 30 and the upper surface of the leaf valve elements 20 may have suitable dimensions. Furthermore the support shim 22 has a function of supporting the non-return valve element 30. That is, the upper surface of the support shim 22 serves as an inner valve seat 46 for the non-return valve element 30. To this end, it is preferable that the upper surface of the support shim 22 is in coplanar relationship with the top annular surface of the annular ridge or wall 36 of the piston 10. As a result, the thickness of the shim 18 is selected depending upon the sum of the thickness of the leaf valve elements 20 and that of the support shim 22.

The leaf valve elements 20 are in the form of an annular flexible plate or disk with the outer periphery extended the outer circle of the annulus containing the holes 34 of the non-return valve element 30. In the first embodiment, the leaf valve elements 20 are shown as comprising two disks, but it is to be understood that the leave valve element assembly may comprises three or more disks or a single disk having a thickness equal to the required overall thickness of two or more disks.

Next the mode of operation of the first embodiment with above construction will be described. During the downward stroke of the piston 10 within the cylinder 14 which is filled with the working oil; that is, the compression stroke of the hydraulic shock absorber, the pressure of working oil below the piston 10 increases, thereby forcing the non-return valve element 30 upwards against the spring member 32. The upper flange 24 of the valve stop 26 limits the maximum stroke or lift of the non-return valve element 30. The non-return valve element 30 is therefore moved away from the outer valve seat 42; that is, the annular top surface of the annular ridge or wall 36 of the piston 10 and spontaneously the orifice passage 44 which is defined between the leaf valve element 20 and the non-return valve element 30 is increased in dimension.

Therefore the working oil under the piston 10 may flow through the enlarged orifice passage 44, through the holes 34 of the non-return valve element 30 and the passage opened between the latter and the outer valve seat 42 into the upper chamber above the piston 10 without experiencing no resistance. As a result, the hydraulic shock absorber may be compressed without encountering any damping force.

During the compression stroke of the hydraulic shock absorber, the pressure increase in the chamber below the piston 10 also causes the leaf valve element 20 to deflect upwards. Since the support shim 22 overlies the leaf valve element 20 with the outer periphery 48 of the support shim 22 extended more radially outwardly than the shim 18 below the leaf valve element 20, the support shim 22 serves to limit the upward deflection of the leaf valve element 20. That is, the upward deflection of the leaf valve element 20 is less than that of the non-return valve element 30.

During the expansion stroke (that is, when the piston 10 moves upwards in FIG. 1), the non-return valve element 30 is forced to abut against the outer valve seat 42 and the inner valve seat 46 which is the upper surface of the support shim 22. That is, both the outer and inner valve seats 42 and 46 are closed with the non-return valve element 30. As a result, when the piston stroke is relatively slow, the working oil in the upper chamber above the piston 10 is forced to flow through the holes of the non-return valve element 30, the orifice passage 44 and the through holes 38 of the piston 10 into the chamber below the piston 10. In this case, the hydraulic shock absorber generates the damping force, the magnitude of which is proportional to the square of the piston stroke or speed, due to the frictional resistances which the working oil encounters when it flows through the orifice passage 44. It follows therefore that thus produced damping force is dependent upon the dimensions of the orifice passage 44 which is defined between the leaf valve element 20 and the non-return valve element 30 and more particularly the thickness of the support shim 22 interposed between them.

When the piston stroke is increased and the pressure of the working oil above the piston 10 exceeds a certain value, the leaf valve element 20 is forced to deflect itself downwards along the deflecting line 50; that is, the outer periphery of the shim 18, away from the non-return valve element 30. As a result, the orifice passage 44 is again increased in dimensions so that the flow rate of the working oil flowing from the upper chamber into the lower chamber increases so that the pressure of the working oil above the piston increases in proportion to the piston stroke or speed. Thus, the hydraulic shock absorber produces the damping force which is proportional in magnitude to the piston stroke or speed.

At the instant when the hydraulic shock absorber switches from its compression stroke to its expansion stroke, the non-return valve element 30 closes both the outer and inner valve seats 42 and 46 are described above, but it is to be emphasized that the flow of the working oil from the upper chamber above the piston 10 to the lower chamber is not completely shut off, but it may flow through the holes 34 of the non-return valve element 30, the orifice passage 44 and the thorugh holes 38 of the piston as described above. Therefore the shock which tends to be felt at the instant the non-return valve 30 is closed may be substantially eliminated.

The leaf valve element 20 is snugly fitted over the reduced-diameter lower portion of the piston rod 12 and is securely held in position between the shim 18 and the support shim 22 which in turn is abutted against the lower end of the valve stop 26. Therefore the leaf valve element 20 is always caused to deflect itself downwards along the deflecting line or the outer periphery of the shim 18 so that the damping force produced during the expansion stroke of the hydraulic shock absorber may be statsifactorily stabilized.

Figure 2:
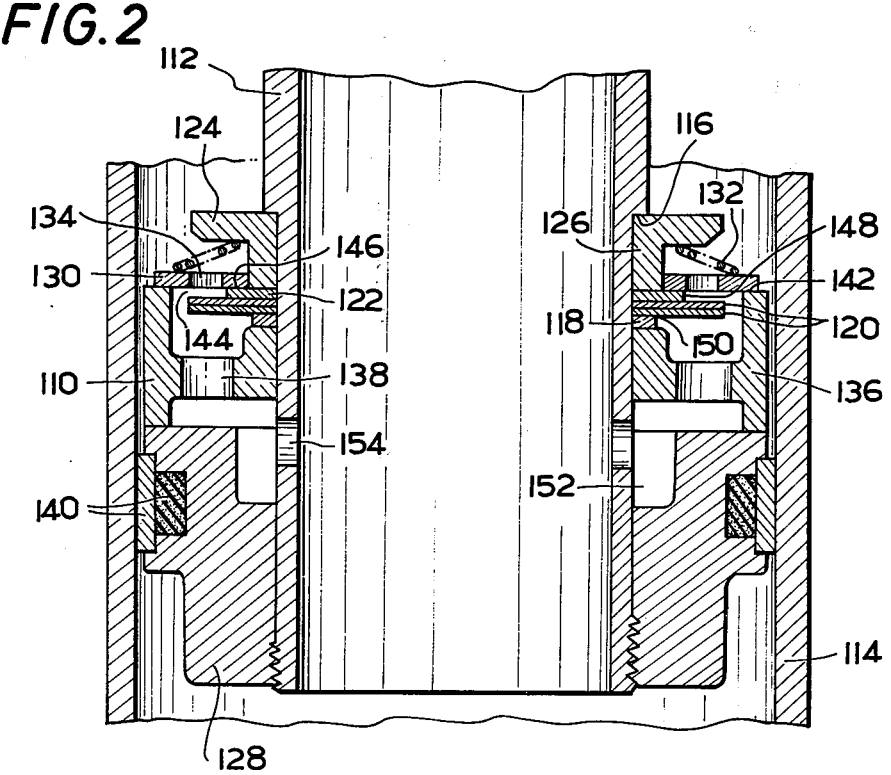

Second Embodiment, FIG. 2

The present invention may be equally applied to a hydraulic shock absorber of the type comprising an outer tube and an inner tube telescopically fitted therein as will be described hereinafter with reference to FIG. 2, wherein in order to designate parts similar to those shown in FIG. 1, 100 is added to the reference numerals used in FIG. 1. Since the second embodiment shown in FIG. 2 is substantially similar in construction to the first embodiment shown in FIG. 1, only the difference between them will be described.

Whereas the hydraulic shock absorber shown in FIG. 1 comprises the piston, the piston rod 12 and the cylinder, the hydraulic shock absorber shown in FIG. 2 comprises an inner tube 112 upon which is mounted a piston 110 and an outer tube 114.

The sub-assembly comprising a shim 118, a leaf valve element 120, a support shim 122 and a valve stop 126 is interposed between the shoulder 116 of the inner tube 112 and a nut 128 screwed to the lower end thereof.

The nut 128 is formed with an annular groove in the outer peripheral wall thereof and a seal member consisting of an O-ring and a piston ring is fitted in the annular groove. The seal member 140 is made into slidable contact with the inner wall of the outer tube 114 and divides the latter into a chamber above the piston 110 and a chamber below it. Therefore in the second embodiment the piston 110 is not provided with a seal member and makes no slidable contact with the inner wall surface of the outer tube 114. The through holes 138 of the piston 110 are communicated with the chamber below the piston 110 through a recess 152 formed in the top surface of the nut 128, a plurality of holes 154 formed through the wall of the inner tube 112 and the interior of the inner tube 112. Therefore it is apparent to those skilled in the art that the hydraulic shock absorber shown in FIG. 2 may produce the damping force in a manner substantially similar to that described above with reference to FIG. 1 so that no further detailed description shall be made. However, it must be emphasized that in the shock absorber of the type shown in FIG. 2, the spacing between the outer and inner tubes 114 and 112 cannot be increased beyond a certain limit so that the difference between the outer and inner diameters of the leaf valve element 120 becomes shorter than that in the shock absorber shown in FIG. 1, but the variations in damping force may be eliminated because according to the present invention the shim 118 is disposed below the leaf valve element 120 so as to restrain its downward deflection as described elsewhere.

What is claimed is:

1. A piston valve device for generating the damping force in a hydraulic shock absorber comprising in combination
   (a) an outer member filled with the working oil,
   (b) an inner member telescopically fitted into said outer member,
   (c) a piston securely mounted on said inner member,
   (d) a valve stop securely mounted on said inner member (above said piston),
   (e) a non-return valve element which is axially slidably fitted over said valve stop and is formed with a plurality of (equiangularly spaced) holes, said non-return valve element being opened during the compression stroke (of said hydraulic shock absorber), thereby permitting the free flow of said working oil,
   (f) a leaf valve element securely fitted (on said inner member) between said piston and said valve stop and radially outwardly extended beyond said holes of said non-return valve element, and
   (g) a support shim securely fitted (on said inner member) between said leaf valve element and said non-return valve element in such a way that an orifice passage may be defined between said leaf valve element and said non-return valve element,
   the outer diameter of said support shim being such that the outer periphery thereof may be located in contact with or in slightly radially inwardly spaced relation with the inner circle of the annulus containing said holes of said non-return valve element.

2. A piston valve device as set forth in claim 1 wherein both of said non-return valve element and said support shim are in the form of an annular rigid plate or disk while said leaf valve element is in the form of an annular flexible plate or disk.

3. A piston valve device as set forth in claim 2 wherein said non-return valve element is normally pressed against the support shim and an annular ridge or wall extended axially upwardly from the top of said piston, and the upper surface of said support shim serves as an inner valve seat for said non-return valve element while the top surface of said annular ridge or wall, as an outer valve seat.

4. A piston valve device as set forth in claim 3 wherein an additional shim is interposed between said piston and said leaf valve element, the thickness of said additional shim being so selected that said top surface of said support shim may be in coplanar relationship with said top surface of said annular ridge or wall of said piston.

* * * * *